US012649401B2

(12) United States Patent  (10) Patent No.: US 12,649,401 B2
Han et al.  (45) Date of Patent: Jun. 9, 2026

(54) SEAT CONTROL APPARATUS AND METHOD

(71) Applicants:HYUNDAI MOTOR COMPANY, Seoul (KR); KIA CORPORATION, Seoul (KR)

(72) Inventors: Kug Hun Han, Seoul (KR); Dong Hoon Lee, Hwaseong-si (KR); Du Se Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 74 days.

(21) Appl. No.: 18/602,820

(22) Filed: Mar. 12, 2024

(65) Prior Publication Data

US 2024/0375569 A1 Nov. 14, 2024

(30) Foreign Application Priority Data

May 14, 2023 (KR) ........................ 10-2023-0062087
Nov. 2, 2023 (KR) ........................ 10-2023-0150355

(51) Int. Cl.
*B60N 2/90* (2018.01)
*B60N 2/02* (2006.01)
(52) U.S. Cl.
CPC ........... *B60N 2/976* (2018.02); *B60N 2/0272* (2023.08); *B60N 2/0278* (2023.08)
(58) Field of Classification Search
CPC .... B60N 2/976; B60N 2/0272; B60N 2/0278; B60N 2220/20; B60N 2/0228
See application file for complete search history.

(56) References Cited

U.S. PATENT DOCUMENTS

| 4,655,505 | A | * | 4/1987 | Kashiwamura | ........ | B60N 2/976 |
| | | | | | | 297/284.6 |
| 4,833,614 | A | * | 5/1989 | Saitoh | .................. | B60N 2/0233 |
| | | | | | | 297/284.6 |
| 5,127,708 | A | * | 7/1992 | Kishi | ....................... | A61B 5/18 |
| | | | | | | 297/284.6 |
| 5,155,685 | A | * | 10/1992 | Kishi | ....................... | B60N 2/66 |
| | | | | | | 318/467 |
| 5,243,267 | A | * | 9/1993 | Ogasawara | .............. | B60N 2/66 |
| | | | | | | 318/590 |
| 5,254,924 | A | * | 10/1993 | Ogasawara | ........ | B60N 2/02246 |
| | | | | | | 318/590 |

(Continued)

FOREIGN PATENT DOCUMENTS

| KR | 102092130 B1 | 3/2020 |
| KR | 20210068701 A | 6/2021 |

(Continued)

*Primary Examiner* — Bhavesh V Amin
(74) *Attorney, Agent, or Firm* — Lempia Summerfield Katz LLC

(57) ABSTRACT

A seat control apparatus receives a user input from a user through an input part. The seat control apparatus may identify, among a plurality of input devices included in the input part, a type of an input device corresponding to the user input, and determine whether the massage function is to be performed, based on information of at least one of the identified type of the input device, a state of a host vehicle, a location state of the seat, a compulsory driving setting state of the massage function, or any combination thereof.

18 Claims, 8 Drawing Sheets

(56) References Cited

U.S. PATENT DOCUMENTS

| | | | | |
|---|---|---|---|---|
| 5,455,494 | A * | 10/1995 | Ogasawara | B60N 2/666 297/DIG. 3 |
| 5,523,664 | A * | 6/1996 | Ogasawara | B60N 2/66 318/590 |
| 5,792,080 | A * | 8/1998 | Ookawa | A61H 15/0078 601/134 |
| 5,812,399 | A * | 9/1998 | Judic | B60N 2/0226 296/65.01 |
| 6,049,748 | A * | 4/2000 | Newman | H03H 1/0007 297/284.4 |
| 6,087,942 | A * | 7/2000 | Sleichter, III | G08B 21/06 340/576 |
| 6,203,105 | B1 * | 3/2001 | Rhodes, Jr. | B60N 2/806 297/284.6 |
| 6,339,302 | B1 * | 1/2002 | Greenbank | B60N 2/66 318/567 |
| 6,375,630 | B1 * | 4/2002 | Cutler | A61H 23/0263 601/57 |
| 6,663,184 | B2 * | 12/2003 | Hagiike | B60N 2/0292 297/217.3 |
| 6,682,494 | B1 * | 1/2004 | Sleichter, III | B60N 2/976 297/217.3 |
| 6,916,300 | B2 * | 7/2005 | Hester | A61H 23/04 601/149 |
| 7,152,920 | B2 * | 12/2006 | Sugiyama | B60N 2/914 297/284.6 |
| 7,172,247 | B2 * | 2/2007 | Beloch | B60N 2/66 297/284.7 |
| 7,311,681 | B1 * | 12/2007 | Vaccarella | A61H 23/0263 601/49 |
| 7,422,285 | B2 * | 9/2008 | Phipps | B60N 2/976 297/284.3 |
| 8,126,616 | B2 * | 2/2012 | Phipps | B60N 2/976 296/64 |
| 8,710,784 | B2 * | 4/2014 | Meyer | B60N 2/5692 318/467 |
| 9,187,020 | B2 * | 11/2015 | Meyer | B60N 2/976 |
| 9,649,067 | B2 * | 5/2017 | Zohar | A61B 5/6893 |
| 9,848,814 | B2 * | 12/2017 | Benson | A61B 5/18 |
| 10,004,873 | B1 * | 6/2018 | Hur | A61B 5/6893 |
| 10,300,823 | B2 * | 5/2019 | Lem | B60N 2/976 |
| 10,647,237 | B2 * | 5/2020 | Song | B60W 10/30 |
| 11,214,183 | B2 | 1/2022 | Lee | |
| 11,241,989 | B2 * | 2/2022 | Rendel | B60N 2/976 |
| 11,577,629 | B2 * | 2/2023 | Meyer | B60N 2/02246 |
| 11,932,144 | B2 * | 3/2024 | Tanabe | B60N 2/68 |
| 11,951,062 | B2 * | 4/2024 | Lee | B60N 2/0233 |
| 12,344,151 | B2 * | 7/2025 | Lee | B60N 2/0272 |
| 12,447,882 | B2 * | 10/2025 | Choi | B60N 2/806 |
| 2002/0068887 | A1 * | 6/2002 | Kikumoto | A61H 15/0078 601/57 |
| 2002/0111570 | A1 * | 8/2002 | Cutler | A61H 23/0263 601/57 |
| 2002/0158497 | A1 * | 10/2002 | Nivet | B64D 11/064 297/330 |
| 2003/0038517 | A1 * | 2/2003 | Moran | B60N 2/914 297/284.6 |
| 2005/0052060 | A1 * | 3/2005 | Beloch | B60N 2/0228 297/284.7 |
| 2006/0049678 | A1 * | 3/2006 | Kern | A47C 7/467 297/284.1 |
| 2006/0155429 | A1 * | 7/2006 | Boone | B60W 50/14 701/1 |
| 2007/0200392 | A1 * | 8/2007 | Eiswirth | B60N 2/34 296/190.02 |
| 2009/0099490 | A1 * | 4/2009 | Durt | B60N 2/99 297/284.3 |
| 2011/0055720 | A1 * | 3/2011 | Potter | G06F 3/0481 709/217 |
| 2012/0032478 | A1 * | 2/2012 | Friderich | B60N 2/5685 297/180.1 |
| 2013/0038102 | A1 * | 2/2013 | Friderich | B60N 2/665 297/217.4 |
| 2013/0300179 | A1 * | 11/2013 | Ota | B60N 2/66 297/452.42 |
| 2014/0025258 | A1 * | 1/2014 | Lem | B60N 2/976 701/36 |
| 2014/0032043 | A1 * | 1/2014 | Line | B60N 2/976 701/36 |
| 2014/0207333 | A1 * | 7/2014 | Vandivier | B60N 2/0278 701/36 |
| 2014/0275834 | A1 * | 9/2014 | Bennett | A61B 5/0205 600/300 |
| 2014/0309893 | A1 * | 10/2014 | Ricci | G06F 21/32 701/1 |
| 2015/0126916 | A1 * | 5/2015 | Hall | A61H 9/0078 601/149 |
| 2016/0354026 | A1 * | 12/2016 | Zohar | B60N 2/976 |
| 2018/0029502 | A1 * | 2/2018 | Georgiev | B60N 2/0233 |
| 2018/0170231 | A1 * | 6/2018 | Song | B60W 30/182 |
| 2020/0108759 | A1 | 4/2020 | Rendel | |
| 2020/0114150 | A1 * | 4/2020 | Monteiro | A61F 7/0053 |
| 2020/0198658 | A1 * | 6/2020 | Suzuki | B60W 60/0013 |
| 2020/0215949 | A1 * | 7/2020 | Carles | B60N 2/806 |
| 2021/0162904 | A1 | 6/2021 | Lee | |
| 2021/0257080 | A1 * | 8/2021 | Iliffe-Moon | B60N 2/0228 |
| 2022/0031559 | A1 * | 2/2022 | Lee | B60K 35/22 |
| 2023/0001129 | A1 * | 1/2023 | Ito | A47C 7/748 |
| 2023/0201070 | A1 | 6/2023 | Lee | |
| 2024/0001831 | A1 * | 1/2024 | Lee | B60N 2/0233 |
| 2024/0092293 | A1 * | 3/2024 | Dörfler | B60H 3/0035 |
| 2024/0092338 | A1 * | 3/2024 | Dörfler | B60H 3/0078 |
| 2024/0375569 | A1 * | 11/2024 | Han | B60N 2/0272 |

FOREIGN PATENT DOCUMENTS

| | | |
|---|---|---|
| KR | 102326965 B1 | 11/2021 |
| KR | 102358858 B1 | 2/2022 |
| KR | 20230098948 A | 7/2023 |

* cited by examiner

450

SEAT CONTROL APPARATUS AND METHOD

CROSS-REFERENCE TO RELATED APPLICATION

This application claims the benefit of and priority to Korean Provisional Application No. 10-2023-0062087, filed on May 14, 2023, and Korean Patent Application No. 10-2023-0150355, filed on Nov. 2, 2023, the entire contents of each of which are incorporated herein by reference.

TECHNICAL FIELD

The present disclosure relates to a seat control apparatus and a seat control method, and more particularly, to a technology for determining whether to perform a massage function based on various information.

BACKGROUND

The statements in this section merely provide background information related to the present disclosure and may not constitute prior art.

As technology advances, various components in an interior of a vehicle may be operatively connected to each other. In particular, a seat control apparatus may quickly and accurately provide various functions by performing a cooperative control between components for convenience of a user.

For example, a vehicle may include a seat that provides a massage function, and various components (e.g., an acupressure member or an airbag) may be mounted on one area of the seat to provide a massage function to a user who is seated on the seat. As an example, massage refers to a medical supplementary therapy that adjusts a modulation of the body of the patient, helps circulation, and relieves the fatigue of the patient by applying various types of mechanical stimuli to parts of the body of the patient through, for example, kneading, pressing, pulling, tapping, or moving a part of the body of the patient.

For example, a seat (or a massage seat) that provides a massage function may provide a massage function to the user through a pressure generated based on an airbag (or an air cell) or may provide a massage function to the user through a repulsive force to a space, in which the user is seated, by rotating a wire by using a motor and deforming a frame (or a plastic plate). Recently, a striking massage seat provides a massage function based on a relatively strong pressure by using a motor and a striking part.

However, a user who sits on a vehicle seat may not simply sit on the seat to receive a massage function. For example, the user may desire to be selectively provided with a location (or an operation state) of the seat and whether to activate the massage function.

Furthermore, as a performance of massage seat gradually improves, a frequency of use of the massage function is increasing, for example, the user seated on the seat wants the massage function to be provided even when the vehicle is stopped. However, when the massage function is operated indiscriminately while a driving situation or an operating state of the seat, is not considered, a durability of the seat is degraded and a mechanical lifespan thereof become shorter.

SUMMARY

The present disclosure has been made to solve the above-mentioned problems occurring in the prior art while advantages achieved by the prior art are maintained intact.

An aspect of the present disclosure provides a seat control apparatus that identifies a type of an input device that is manipulated (or touched) to allow a user to deliver a user input to the seat control apparatus and determines whether to perform a massage function based on the identified type when receiving the user input (or a switch input) from the user through an input part.

An aspect of the present disclosure also provides a seat control apparatus that determines whether to perform a massage function based on information on at least one of, in addition to a type of an input device, a state of a host vehicle, a location state of a seat, a compulsory driving setting state of a massage function, or any combination thereof.

An aspect of the present disclosure also provides a seat control apparatus that determines whether to execute a massage function based on at least one of a type of a location control input for performing a seat location control function, whether automatic activation of the massage function is possible while the seat location control function is performed, whether the input device corresponds to a massage function interworking target, or any combination thereof while performing the seat location control function corresponding to the input device when the identified type of the input device corresponds to the seat location control function.

An aspect of the present disclosure also provides a seat control apparatus that stops an operation of a second driving part for providing a massage function and controls a seat as a user non-seating section by using a first driving part for controlling a location of a seat when a location control input includes an auto switch input for controlling the seat as the user non-seating section.

An aspect of the present disclosure also provides a seat control apparatus that performs a massage function by using a second driving part by identifying whether an input device corresponds to a massage function interlocking target and whether automatic activation of a massage function is possible while a seat location control function is performed when the location control input does not include an automatic switch input for controlling the seat to a user non-seating section (or when only a manual switch input is included) and adjusting a location of a seat based on a location control input by using a first driving part when the massage function is set to a state, in which the automatic activation is possible while the input device corresponds to the massage function interlocking target and a seat location control function is performed.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a seat control apparatus includes an input part, a first driving part that adjusts a location of a seat, a second driving part that performs a massage function, a memory that stores one or more instructions, and a controller operatively connected to the input part, the first driving part, the second driving part, and the memory. The instructions may, when executed by the controller, cause the seat control apparatus to: receive a user input from a user through the input part; identify, among a plurality of input devices included in the input part, a type of an input device corresponding to the user input; and determine whether the massage function is to be performed, based on information of at least one of the identified type of the input device, a state of a host vehicle, a location state of the seat, a compulsory driving setting state of the massage function, or any combination thereof.

According to an embodiment, the instructions may, when executed by the controller, cause the seat control apparatus to: perform a seat location control function corresponding to the input device when the identified type of the input device corresponds to the seat location control function; and determine whether the massage function is to be executed based on at least one of a type of a location control input for performing the seat location control function, whether an automatic activation of the massage function is possible while the seat location control function is performed, whether the input device corresponds to a massage function interlocking target, or any combination thereof.

According to an embodiment, the instructions may, when executed by the controller, cause the seat control apparatus to: stop an operation of the second driving part when the location control input includes an automatic switch input for controlling the seat to a user non-seating section; and control the seat to the user non-seating section by using the first driving part.

According to an embodiment, the instructions may, when executed by the controller, cause the seat control apparatus to: identify whether the input device corresponds to the massage function interlocking target or whether the automatic activation of the massage function is possible while the seat location control function is performed when the location control input does not include an automatic switch input for controlling the seat to a user non-seating section; and perform the massage function by using the second driving part while adjusting the location of the seat based on the location control input by using the first driving part when the input device corresponds to the massage function interlocking target and the automatic activation of the massage function is set to be possible while the seat location control function is performed.

According to an embodiment, the instructions may, when executed by the controller, cause the seat control apparatus to: identify whether the input device corresponds to the massage function interlocking target and whether the automatic activation of the massage function is possible while the seat location control function is performed when the location control input does not include an automatic switch input for controlling a user non-seating section; adjust the location of the seat based on the location control input by using the first driving part when the input device does not correspond to the massage function interlocking target or the automatic activation of the massage function is impossible while the seat location control function is performed; and deactivate the massage function.

According to an embodiment, the instructions may, when executed by the controller, cause the seat control apparatus to: perform a seat location control function corresponding to the input device when the identified type of the input device corresponds to the seat location control function; identify the type of the input device when it is identified that the input device corresponds to a massage function interlocking target; when the input device includes a manual switch, perform the massage function based on that it is identified that the seat is located in a user seating section when the compulsory driving setting state of the massage function is an on state; and perform the massage function based on that it is identified that the state of the host vehicle satisfies a specific condition and the seat is located in the user seating section when the compulsory driving setting state of the massage function is an off state. According to another embodiment, the instructions may, when executed by the controller, cause the seat control apparatus to: when the input device includes an automatic switch, perform the massage function when the compulsory driving setting state of the massage function is an on state; and perform the massage function based on that it is identified that the state of the host vehicle satisfies the specific condition when the compulsory driving setting state of the massage function is an off state.

According to an embodiment, the instructions may, when executed by the controller, cause the seat control apparatus to: perform the massage function at a first intensity when a battery of the host vehicle is being charged or a state of charge (SoC) thereof is equal to or greater than a first value; perform the massage function at a second intensity that is lower than the first intensity when the SoC of the battery is less than the first value and is equal to or greater than a second value, wherein the second value is less than the first value; and stop performance of the massage function when the SoC of the battery is less than a third value that is less than the second value.

According to an embodiment, the instructions may, when executed by the controller, cause the seat control apparatus to: identify whether the compulsory driving setting state of the massage function is an on state when the identified type of the input device corresponds to the massage function; perform the massage function when the compulsory driving setting state is the on state; and perform the massage function based on that it is identified that the state of the host vehicle satisfies a specific condition or the seat is located in a user seating section when the compulsory driving setting state is an off state.

According to an embodiment, the specific condition includes a condition regarding at least one of: i) an inter-vehicle distance between the host vehicle and another vehicle, ii) whether the host vehicle and an external object collide with each other, iii) whether the user is seated on the seat, iv) whether a child seat is mounted on the seat, v) a power state of the host vehicle, vi) a battery state of the host vehicle, vii) a driving speed of the host vehicle, or viii) any combination thereof.

According to an embodiment, the instructions may, when executed by the controller, cause the seat control apparatus to: perform the massage function regardless of whether the state of the host vehicle satisfies the specific condition when it is identified that the compulsory driving setting state of the massage function is the on state, based on a user setting mode (USM); and automatically perform the massage function based on that the user input for controlling the location of the seat to a specific location is received when it is identified an automatic activation setting state of the massage function for the specific location is an on state, based on the user setting mode.

According to another aspect of the present disclosure, a seat control method includes: receiving, by a controller, a user input from a user through an input part; identifying, by the controller, a type of, among a plurality of input devices included in the input part, an input device corresponding to the user input; and determining, by the controller, whether a massage function is to be performed, based on information of at least one of the identified type of the input device, a state of a host vehicle, a location state of a seat, a compulsory driving setting state of the massage function, or any combination thereof.

According to an embodiment, the determining, by the controller, of whether the massage function is to be performed may include: performing, by the controller, a seat location control function corresponding to the input device when the identified type of the input device corresponds to the seat location control function; and determining, by the controller, whether the massage function is to be executed based on at least one of a type of a location control input for performing the seat location control function, whether an automatic activation of the massage function is possible while the seat location control function is performed, whether the input device corresponds to a massage function interlocking target, or any combination thereof.

According to an embodiment, the seat control method may include: stopping, by the controller, an operation of a second driving part when the location control input includes an automatic switch input for controlling the seat to a user non-seating section; and controlling, by the controller, the seat to the user non-seating section by using a first driving part.

According to an embodiment, the seat control method may include: identifying, by the controller, whether the input device corresponds to the massage function interlocking target or whether the automatic activation of the massage function is possible while the seat location control function is performed when the location control input does not include an automatic switch input for controlling the seat to a user non-seating section; and performing, by the controller, the massage function by using the second driving part while adjusting a location of the seat based on the location control input by using the first driving part when the input device corresponds to the massage function interlocking target and the automatic activation of the massage function is set to be possible while the seat location control function is performed.

According to an embodiment, the seat control method may include: identifying, by the controller, whether the input device corresponds to the massage function interlocking target and whether the automatic activation of the massage function is possible while the seat location control function is performed when the location control input does not include an automatic switch input for controlling a user non-seating section; adjusting, by the controller, a location of the seat based on the location control input by using the first driving part when the input device does not correspond to the massage function interlocking target or the automatic activation of the massage function is impossible while the seat location control function is performed; and deactivating, by the controller, the massage function.

According to an embodiment, the seat control method may include: performing, by the controller, a seat location control function corresponding to the input device when the identified type of the input device corresponds to the seat location control function; and identifying, by the controller, the type of the input device when it is identified that the input device corresponds to a massage function interlocking target. The seat control method may further include: when the input device includes a manual switch, performing, by the controller, the massage function based on that it is identified that the seat is located in a user seating section when the compulsory driving setting state of the massage function is an on state; and performing, by the controller, the massage function based on that it is identified that the state of the host vehicle satisfies a specific condition and the seat is located in the user seating section when the compulsory driving setting state of the massage function is an off state. The seat control method may further include: when the input device includes an automatic switch, performing, by the controller, the massage function when the compulsory driving setting state of the massage function is an on state; and performing, by the controller, the massage function based on that it is identified that the state of the host vehicle satisfies the specific condition when the compulsory driving setting state of the massage function is an off state.

According to an embodiment, the seat control method may include: performing, by the controller, the massage function at a first intensity when a battery of the host vehicle is being charged or a state of charge (SoC) thereof is equal to or greater than a first value; performing, by the controller, the massage function at a second intensity that is lower than the first intensity when the SoC of the battery is less than the first value and is equal to or greater than a second value, wherein the second value is less than the first value; and stopping, by the controller, performance of the massage function when the SoC of the battery is less than a third value that is less than the second value.

According to an embodiment, the seat control method may further include: identifying, by the controller, whether the compulsory driving setting state of the massage function is an on state when the identified type of the input device corresponds to the massage function; performing, by the controller, the massage function when the compulsory driving setting state is the on state; and performing, by the controller, the massage function based on that it is identified that the state of the host vehicle satisfies a specific condition or the seat is located in a user seating section when the compulsory driving setting state is an off state.

According to an embodiment, the specific condition may include a condition regarding at least one of: an inter-vehicle distance between the host vehicle and another vehicle, whether the host vehicle and an external object collide with each other, whether the user is seated on the seat, whether a child seat is mounted on the seat, a power state of the host vehicle, a battery state of the host vehicle, a driving speed of the host vehicle, or any combination thereof.

According to an embodiment, the seat control method may further include: performing, by the controller, the massage function regardless of whether the state of the host vehicle satisfies the specific condition when it is identified that the compulsory driving setting state of the massage function is the on state, based on a user setting mode (USM); and automatically performing, by the controller, the massage function based on that the user input for controlling the location of the seat to a specific location is received when it is identified an automatic activation setting state of the massage function for the specific location is an on state, based on the user setting mode.

BRIEF DESCRIPTION OF THE DRAWINGS

The above and other objects, features and advantages of the present disclosure should be more apparent from the following detailed description taken in conjunction with the accompanying drawings.

In relation to a description of the drawings, the same or similar reference numerals may be used for the same or similar components.

DETAILED DESCRIPTION

Figure 1:
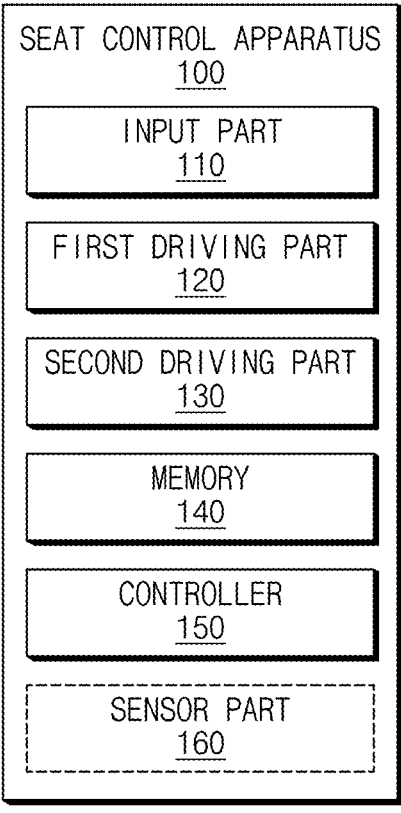
FIG. 1 is a block diagram illustrating components of a seat control apparatus according to an embodiment of the present disclosure.

Hereinafter, some embodiments of the present disclosure are described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions is ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those having ordinary skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or to perform that operation or function.

Hereinafter, referring to FIGS. 1 to 8, embodiments of the present disclosure are described in detail.

FIG. 1 is a block diagram illustrating components of a seat control apparatus according to an embodiment of the present disclosure.

According to an embodiment, a seat control apparatus 100 may include at least one of an input part 110, a first driving part 120, a second driving part 130, a memory 140, a controller 150, a sensor part 160, or any combination thereof. A configuration of the seat control apparatus 100 illustrated in FIG. 1 is illustrative, and the embodiments of the present disclosure are not limited thereto. For example, the seat control apparatus 100 may further include components (e.g., at least one of an interface, a communication part, a display, or any combination thereof) that are not illustrated in FIG. 1.

According to an embodiment, the input part 110 may include at least one switch.

For example, the input part 110 may include at least one switch that is provided in one area of the seat. The one area, for example, may include an area of a backrest of a seat and/or an area of a side cushion of the seat.

For example, the input part 110 may include various types of input devices (e.g., switches) that cause the seat control apparatus 100 to provide different types of functions.

As an example, the input part 110 may include at least one input device corresponding to a seat location control function and at least one input device corresponding to a massage function.

When receiving a user input for at least one input device corresponding to the seat location control function, for example, the seat control apparatus 100 may perform a seat location control function corresponding to the input device. At least one input device corresponding to the seat location control function, for example, may include an automatic switch and/or a manual switch. When receiving a user input for an automatic switch, for example, the seat control apparatus 100 may control the seat to a state corresponding to the corresponding automatic switch. When receiving a user input for a manual switch, for example, the seat control apparatus 100 may control a seat location control (e.g., at least one of adjustment of a reclining angle adjustment, adjustment of a slide location, adjustment of a headrest angle, or adjustment of a leg rest angle, or any combination thereof) corresponding to the corresponding manual switch while receiving a user input for the manual switch.

For example, the input part 110 may deliver a user input based on a user input (e.g., a touch input or a pressure input) that is delivered from a user to the controller 150. For example, when a user input to the input part 110 is more than a specified time period (or an input maintenance request time period), the controller 150 may recognize (or identify) the corresponding user input as a user input.

According to an embodiment, the first driving part 120 may be configured to adjust a location of the seat.

For example, the first driving part 120 may include at least one driving device that adjusts at least one of the reclining angle, the slide location, the headrest angle, the leg rest angle, or any combination thereof.

According to an embodiment, the second driving part 130 may be configured to perform a massage function.

For example, the second driving part 130 may include an acupressure member and/or an airbag. For example, the second driving part 130 may be configured to provide a massage function to the body of the user in contact with an area (e.g., a seating area and/or a backrest area) of the seat.

According to an embodiment, the memory 140 may store commands or data. For example, the memory 140 may store one or more instructions that, when executed by the controller 150, cause the seat control apparatus 100 to perform various operations.

For example, the memory 140 and the controller 150 may be implemented as one chipset. The controller 150 may include at least one of a communication processor or a modem.

According to an embodiment, the controller 150 may be operatively connected to the input part 110, the first driving part 120, the second driving part 130, the memory 140, the sensor part 160, or any combination thereof. For example, the controller 150 may control an operation of at least one of the input part 110, the first driving part 120, the second driving part 130, the memory 140, the sensor part 160, or any combination thereof.

For example, the controller 150 may receive a user input from the user through the input part 110.

As an example, the controller 150 may identify that a user input (e.g., a touch input and/or a pressure input) for some of the plurality of input devices included in the input part 110 is received.

For example, the controller 150 may identify, among a plurality of input devices included in the input part 110, a type of an input device corresponding to the user input.

As an example, the controller 150 may identify the type of input device that is manipulated by the user. The type of input device, for example, may include a type corresponding to a seat location control function and/or a type corresponding to a massage function.

For example, the controller 150 may determine whether the massage function is performed, based on information on at least one of the identified type of the input device, a state of the host vehicle, a location state of the seat, a compulsory driving setting state of the massage function, or any combination thereof.

As an example, when the identified type of the input device corresponds to the seat location control function, the controller 150 may perform the seat location control function corresponding to the input device. The controller 150, for example, may perform, among the above-described seat location control functions, a seat location control function corresponding to the input device by using the first driving part 120, based on it is identified that the identified input device corresponds to an input device regarding at least one of adjustment of the reclining angle, adjustment of the slide location, adjustment of the headrest angle, or adjustment of the leg rest angle of the seat, or a change in a location to a specific operation mode, or any combination thereof.

As an example, the controller 150 may determine whether the massage function is to be executed based on at least one of a type of the location control input for performing the seat location control function while performing the seat location control function, whether automatic activation of the massage function is possible while performing the seat location control function, whether the input device corresponds to a massage function interlocking target, or any combination thereof.

As an example, the controller 150 may stop an operation of the second driving part 130 when the location control input includes an automatic switch input for controlling the seat to the user non-seating section. In other words, the controller 150 may stop the operation of the second driving part 130 or deactivate the second driving part 130 when the second driving part 130 is not being operated based on that it is identified that the user has delivered the user input to the automatic switch for controlling the seat to the user non-seating section. For example, the controller 150 may control the seat to the user non-seating section by using the first driving part 120, based on that it is identified that the user input corresponds to an automatic switch input for controlling the seat to the user non-seating section.

As an example, when the location control input does not include an automatic switch input for controlling the seat to the user non-seating section, the controller 150 may identify whether the input device corresponds to the massage function interlocking target and whether automatic activation of the massage function is possible while the seat location control function is performed. In other words, the controller 150 may identify whether the above-described conditions are satisfied to perform the massage function when the location control input includes at least one of an automatic switch input for controlling the seat to the user seating section or a manual switch input in the user seating section, or any combination thereof. For example, when the input device corresponds to the massage function interlocking target, and in a state, in which automatic activation of the massage function is possible while the seat location control function is performed, the controller 150 may perform the massage function by using the second driving part 130 while controlling the location of the seat by using the first driving part 120. In other words, the controller 150 may identify that the input device that has received the user input corresponds to an input device that simultaneously performs the massage function in association while corresponding to the location control function of the seat. Furthermore, the controller 150 may identify a user setting status regarding whether automatic activation of the massage function is possible and identify that the automatic activation of the massage function is set to possible. As another example, when the input device does not correspond to the massage function interlocking target or the automatic activation of the massage function is set to impossible while the seat location control function is performed, the controller 150 may adjust the location of the seat based on the location control input by using the first driving part 120 and may deactivate the massage function. In other words, when even either of the two conditions is not satisfied, the controller 150 may not provide the massage function while performing the seat location control function corresponding to user input (or the location control input generated based on that the user input is received).

For example, when the identified type of the input device corresponds to the seat location control function, the controller 150 may perform the seat location control function corresponding to the input device, and may identify the type of the input device when it is identified that the input device corresponds to the massage function interlocking target. Then, when the input device includes the manual switch, the controller 150 may perform the massage function based on that it is identified that the seat is located in the user seating section when the compulsory driving setting state of the massage function is an on state and may perform the massage function based on that it is identified that the state of the host vehicle satisfies a specific condition or that the seat is located in the user seating section when the compulsory driving setting state of the massage function is an off state. In the above example, when the compulsory driving setting state of the massage function is an off state, the controller 150 may perform the massage function only when it is identified that the state of the host vehicle satisfies a specific condition and the seat is located in the user seating section at the same time. Furthermore, when the input device includes an automatic switch, the controller 150 may perform the massage function when the compulsory driving setting state of the massage function is an on state, and may perform the massage function based on that it is identified that the state of the host vehicle satisfies a specific condition when the compulsory driving setting state of the massage function is an off state.

As an example, when the identified type of the input device corresponds to the massage function, the controller 150 may identify whether the compulsory driving setting state of the massage function is an on state. For example, when the compulsory driving setting state is an on state, the controller 150 may perform the massage function. For example, when the compulsory driving setting state is an off state, the controller 150 may perform the massage function based on that it is identified that the state of the host vehicle satisfies a specific condition or that the seat is located in the user seating section. For example, when the compulsory driving setting state is an off state, the controller 150 may perform the massage function only when it is identified that the state of the host vehicle satisfies a specific condition and the seat is located in the user seating section at the same time.

As an example, specific conditions regarding the state of the host vehicle include a condition regarding at least one of at whether the inter-vehicle distance between the host vehicle and another vehicle is a specified distance or less, whether there is a collision between the host vehicle and an external object (or whether there is a possibility of collision), and whether the user is seated on the seat, whether a child seat is mounted on the seat, the power state of the host vehicle, whether the battery state of the host vehicle satisfies a specific situation, or whether the driving speed of the host vehicle is a specified speed or less, or any combination thereof.

As an example, the controller 150 may perform the massage function in different ways depending on the state of the battery of the host vehicle.

The controller 150, for example, may perform the massage function with a first intensity when the battery of the host vehicle is being charged or the state of charge (SoC) thereof is a first value or more.

For example, when the SoC of the battery is less than the first value and is more than the second value or more that is less than the first value, the controller 150 may perform the massage function with a second intensity that is lower than the first intensity.

For example, the controller 150 may stop performance of the massage function (or deactivate the massage function) when the SoC of the battery is a third value that is less than the second value.

As an example, when identifying that the compulsory driving setting state of the massage function is an on state, based on the user setting mode (USM), the controller 150 may perform the massage function regardless of whether the state of the host vehicle satisfies a specific condition. For example, when identifying that an automatic activation setting state of the massage function for a specified location is an on state, based on the user setting mode, the controller 150 may automatically perform the massage function based on that a user input for controlling the location of the seat to the specific location has been received.

According to an embodiment, the sensor part 160 may acquire information for a seat control by using various types of sensors.

For example, the sensor part 160 may include at least one Hall sensor.

For example, the sensor part 160 may acquire sensor information including information on the location of the seat while the location of the seat is controlled.

Figure 2:
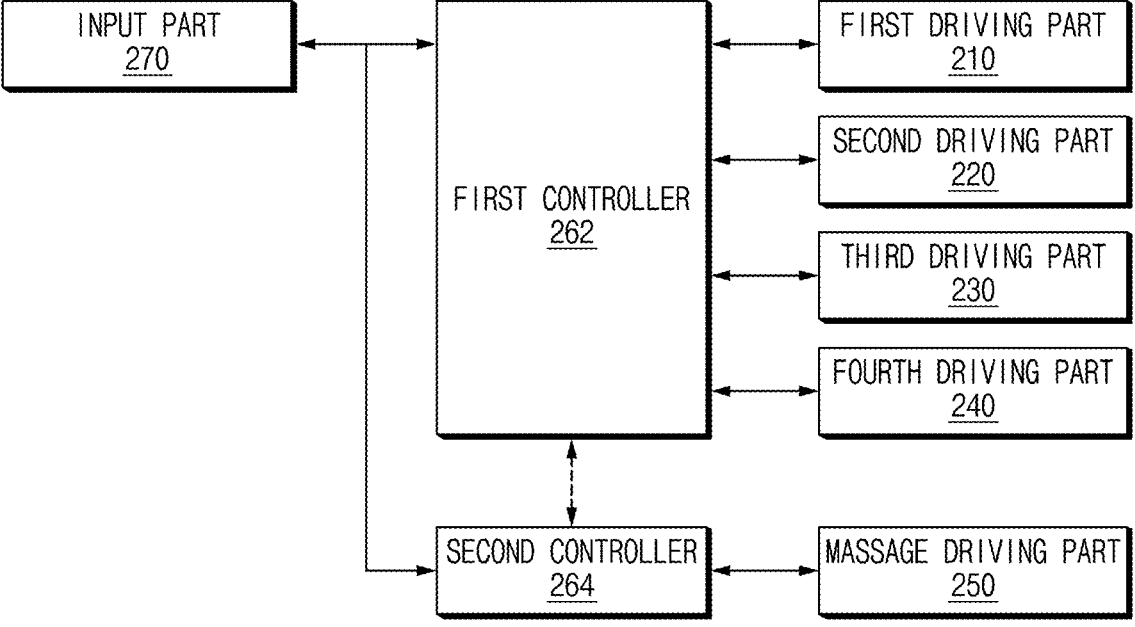
FIG. 2 is a block diagram illustrating components of a seat control apparatus according to an embodiment of the present disclosure.

FIG. 2 is a block diagram illustrating components of a seat control apparatus according to an embodiment of the present disclosure.

According to an embodiment, the seat control apparatus (e.g., the seat control apparatus 100 of FIG. 1) includes an input part 270 (e.g., the input part 110 of FIG. 1), a first controller 262, and a second controller 264, a first driving part 210, a second driving part 220, a third driving part 230, a fourth driving part 240, and a massage driving part 250.

For example, the first controller 262 and the second controller 264 may be control devices for controlling different functions. For example, the first controller 262 may be configured to control the location control function of the seat, and the second controller 264 may be configured to control the massage function through the seat. As an example, the first controller 262 and the second controller 264 may be implemented as one controller (e.g., the controller 150 in FIG. 1).

For example, the input part 270 may include at least one input device (e.g., a switch). The input part 270 may include an input device corresponding to the location control function of the seat and/or an input device corresponding to the massage function through the seat.

For example, when receiving a user input through the input part 270, the seat control apparatus may determine whether the massage function is to be performed based on information on at least one of a type of input device corresponding to the received user input, a state of the host vehicle, a real-time location state of the seat, or a compulsory driving setting state of the massage function, or any combination thereof.

For example, the seat control apparatus may include driving parts (e.g., the first driving part 120 of FIG. 1) for the location control of the seat, including the first driving part 210, the second driving part 220, the third driving part 230, and the fourth driving part 240.

As an example, the first driving part 210 may include at least one driving device that is configured to adjust the backrest angle (or the reclining angle) of the seat.

As an example, the second driving part 220 may include at least one driving device that is configured to adjust the leg rest angle of the seat.

As an example, the third driving part 230 may include at least one driving device that is configured to adjust the height of the seat (or the height of the cushion).

As an example, the fourth driving part 240 may include at least one driving device that is configured to adjust the slide location of the seat (or the relative location of the seat from the front seat or the rear seat).

In FIG. 2, it is illustrated that the first driving part 210, the second driving part 220, the third driving part 230, and the fourth driving part 240 correspond to distinguished configurations, but this is illustrative, and the first driving part 210, the second driving part 220, the third driving part 230, and the fourth driving part 240 may be implemented as one driving part (e.g., the first driving part 120 in FIG. 1).

For example, the seat control apparatus may include at least one driving part (e.g., the second driving part 130 of FIG. 1) for the location control of the seat including the massage driving part 250.

As an example, the massage driving part 250 may be configured to provide the user with the massage function through a massage module that is mounted on at least a portion of an area of the seat, which is in contact with the body of the user.

For example, when receiving a user input including a request to provide a seat location control function from the user through the input part 270, the seat control apparatus may perform a seat location control function corresponding to the user input by controlling the first driving part 210, the second driving part 220, the third driving part 230, and the fourth driving part 240 by using the first controller 262.

For example, when receiving a user input including a request to provide a massage function through the seat from the user through the input part 270, the seat control apparatus may perform a massage function corresponding to the user input by controlling the massage driving part 250 by using the second controller 264.

For example, the first controller 262 and the second controller 264 may be independent control devices that are distinguished from each other.

For example, when receiving a user input through the input part 270, the second controller 264 may independently determine whether to perform the massage function.

As another example, when receiving a user input through the input part 270, the second controller 264 may determine whether to perform the massage function based on a cooperative control with the first controller 262. In this case, the second controller 264 may receive information on the seat location control function from the first controller 262, and the first controller 262 may receive information on the massage function from the second controller 264.

Figure 3:
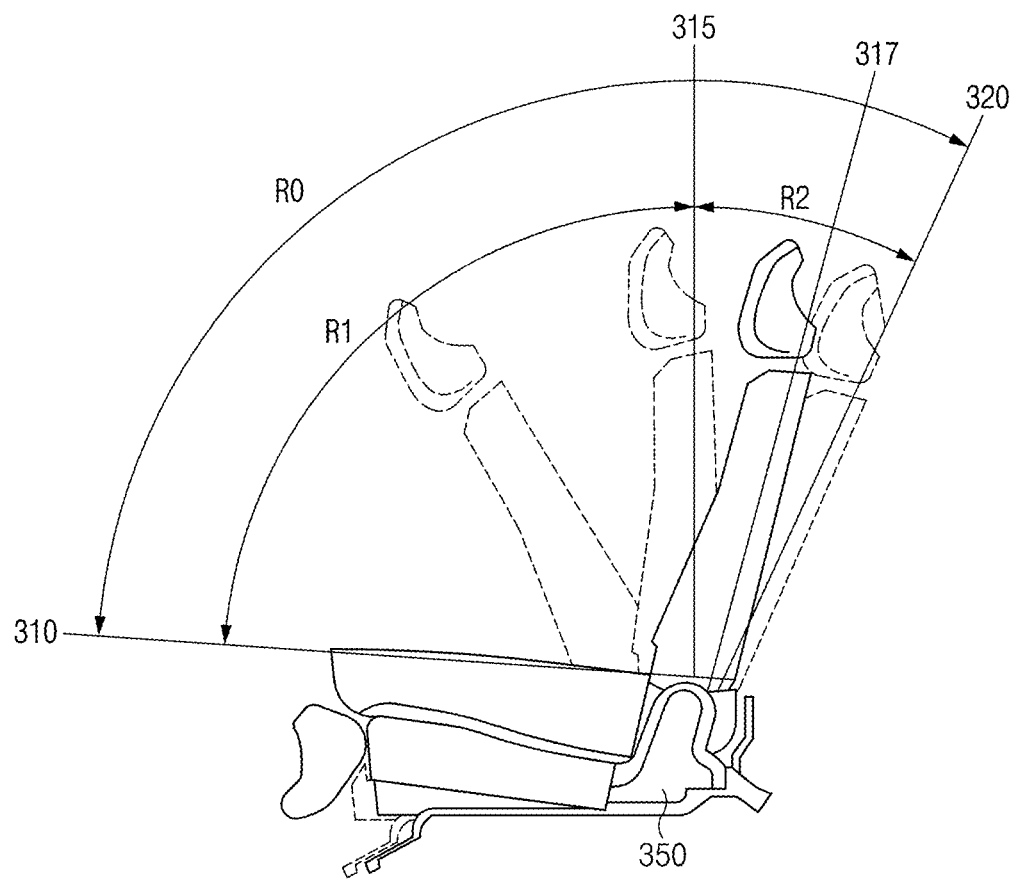
FIG. 3 is a conceptual view illustrating an operation section of a seat according to an embodiment of the present disclosure.

FIG. 3 is a conceptual view illustrating an operation section of the seat according to an embodiment of the present disclosure.

According to an embodiment, the seat control apparatus (e.g., the seat control apparatus 100 of FIG. 1) may identify a real-time location of a seat 350. For example, the seat control apparatus may identify the real-time location (or the operation state) of the seat by using a sensor part (e.g., the sensor part 160 of FIG. 1), and may identify in which of a user non-seating section R1 or a user seating section R2 the identified location is located.

For example, the seat control apparatus may identify in which of the user seating section R2 or the user non-seating section R1 the identified location is located depending on a size of the backrest angle (or the reclining angle) of the seat 350. The seat control apparatus may adjust the backrest angle of the seat 350 within an angle range of R0 by using a driving part (e.g., the first driving part 120 in FIG. 1).

For example, when the backrest (or the headrest) of the seat 350 is located on an extension line of a point between a first line 310 and a second line 315, the seat control apparatus may identify that the seat 350 is located in the user non-seating section R1. In other words, the seat control apparatus may identify that the seat 350 is located in a section, in which the user has a difficulty in sitting.

For example, when the backrest (or the headrest) of the seat 350 is located on an extension line of a point between the second line 315 and a third line 320, the seat control apparatus may identify that the seat 350 is located in the user seating section R2. In other words, the seat control apparatus may identify that the seat 350 is located in a section, in which the user may be seated.

For example, when the backrest (or the headrest) of the seat 350 is located on an extension line of a reference line 317, the seat control apparatus may identify that the seat 350 is located in the user seating section R2.

Figure 4:
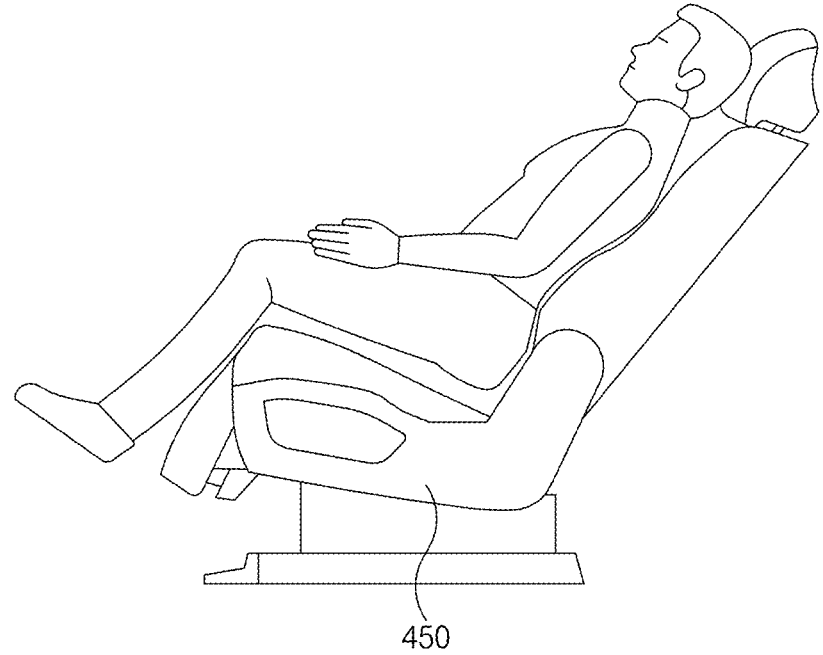
FIG. 4 is a conceptual view illustrating a specific operation mode of a seat according to an embodiment of the present disclosure.

FIG. 4 is a conceptual view illustrating a specific operation mode of a seat according to an embodiment of the present disclosure.

According to an embodiment, a seat control apparatus (e.g., the seat control apparatus 100 of FIG. 1) may control a seat 450 to the location illustrated in FIG. 4. The operation mode of the seat illustrated in FIG. 4 may be defined as a rest mode.

For example, the seat control apparatus may store the seat location information (e.g., the reclining angle, the slide location, the location and the angle of the headrest, or the location and the angle of the leg rest) according to the rest mode. Thereafter, when a user input including a request for a location control in rest mode is received through an input part (e.g., the input part 110 in FIG. 1), the location of the seat may be controlled to a state according to FIG. 4.

For example, the seat control apparatus may identify the compulsory driving setting state of the massage function corresponding to the rest mode based on the user setting mode (USM).

For example, the user and/or the producer may change the compulsory driving setting state of the massage function to cause the seat control apparatus to perform or not forcibly perform the massage function when the seat is disposed in the rest mode, through manipulation of the user setting mode.

As an example, when identifying that the user manually controls the seat location such that the seat location corresponds to the rest mode or controls the seat location to a location within a specific range (e.g., when a difference between the reclining angle and the angle according to the rest mode is less than 10 degrees) through a manual switch, the seat control apparatus may identify the compulsory driving setting state of the massage function corresponding to the rest mode based on the user setting mode, and may provide the massage function to the user by operating the driving part for provision when the compulsory driving setting state of the massage function is an on state.

For example, when the user delivers a user input that requests to control the location of the seat to the rest mode through an automatic switch to the seat control apparatus, the seat control apparatus may identify the compulsory driving setting state of the massage function corresponding to the rest mode based on the user setting mode after controlling the seat to the rest mode, and may provide the massage function to the user by operating the driving part for providing the massage function when the compulsory driving setting state of the massage function is an on state.

Figure 5:
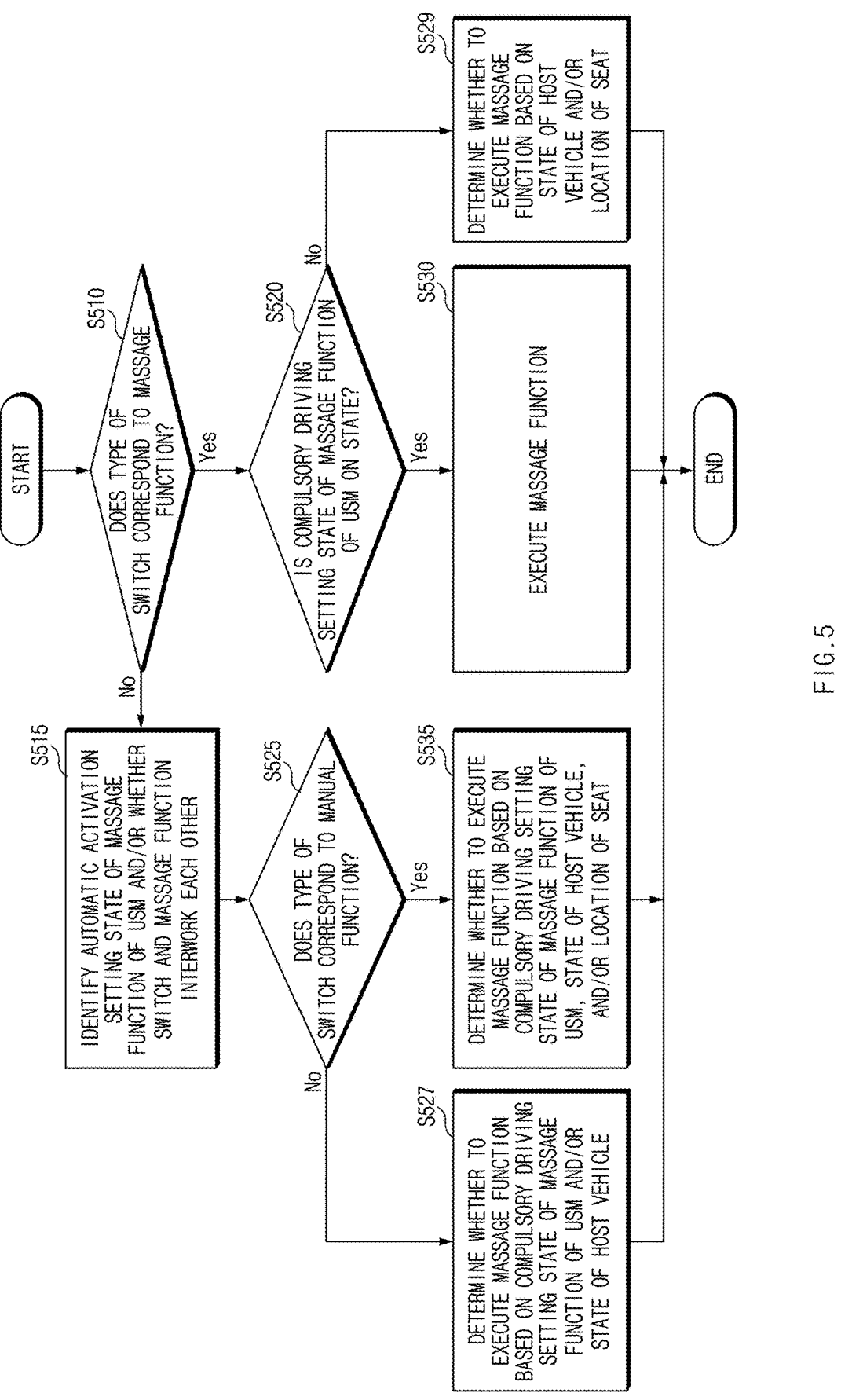
FIG. 5 is a flowchart of a seat control method according to an embodiment of the present disclosure.

FIG. 5 is a flowchart of a seat control method according to an embodiment of the present disclosure.

According to an embodiment, a seat control apparatus (e.g., the seat control apparatus 100 of FIG. 1) may perform the operations disclosed in FIG. 5. For example, the components (e.g., the input part 110, the first driving part 120, the second driving part 130, the memory 140, the controller 150, and the sensor part 160 of FIG. 1) included in the seat control apparatus may be configured to perform the operations of FIG. 5.

In the following embodiments, operations S510 to S535 may be performed sequentially, but are not necessarily performed sequentially. For example, a sequence of the operations may be changed, and at least two operations may be performed in parallel. Furthermore, contents that correspond to or overlap the contents described above with reference to FIG. 5 may be briefly described or omitted.

According to an embodiment, the seat control apparatus may identify whether the switch type corresponds to the massage function (an operation S510).

For example, the seat control apparatus may identify whether the type of the input device (or the switch) that receives the user input from the user corresponds to the massage function. In other words, it may be identified whether the switch corresponding to the user input is a switch for the massage function or a switch for the seat location control function.

For example, when the type of the switch corresponds to the massage function (e.g., operation S510—Yes), the seat control apparatus may perform an operation S520.

For example, when the type of the switch does not correspond to the massage function (e.g., operation S510—No), the seat control apparatus may perform an operation S515.

According to an embodiment, in an operation S515, the seat control apparatus may identify an automatic activation setting state of the massage function of the USM (user setting mode) and/or whether the switch and the massage function interwork with each other.

For example, the seat control apparatus may identify whether the massage function is set to be automatically activated based on the setting state of the user setting mode and whether the switch (e.g., the switch corresponding to the seat location control function) corresponding to user input is a switch that interwork to perform the massage function together.

According to an embodiment, in an operation s525, the seat control apparatus may identify whether the type of the switch corresponds to the manual function.

For example, the seat control apparatus may identify whether the switch corresponding to the user input corresponds to the manual switch (e.g., a switch corresponding to that location control function for manually controlling the location of the seat).

For example, when the type of the switch corresponds to the manual function (e.g., "Yes" in the operation S525), the seat control apparatus may perform an operation S535.

For example, when the type of the switch does not correspond to the manual function (or when the type of the switch corresponds to an automatic function) (e.g., "No" in the operation S525), the seat control apparatus may perform an operation S527.

According to an embodiment, in an operation S535, the seat control apparatus may determine whether to execute the massage function based on the massage function compulsory driving setting state of the USM, the state of the host vehicle, and/or the seat location.

For example, when identifying that compulsory driving setting of the massage function is in an on state, the seat control apparatus may perform the massage function regardless of whether other conditions are satisfied.

For example, when identifying the massage function compulsory driving setting is in an off state, the seat control apparatus may perform the massage function based on that the host vehicle state and/or the real-time seat location satisfies the conditions for performing the massage function.

According to an embodiment, in an operation S527, the seat control apparatus may determine whether to execute the massage function based on the massage function compulsory driving setting state of the USM and/or the host vehicle state.

For example, when identifying that the type of the switch corresponds to the automatic function, the seat control apparatus may control the location of the seat to a location corresponding to the automatic function, and may determine whether to execute the massage function based on the massage function compulsory driving setting state of the USM and the state of the host vehicle state while controlling the location of the seat.

According to an embodiment, in an operation S520, the seat control apparatus may identify whether the massage function compulsory driving setting state of the USM is an on state.

For example, when the massage function compulsory driving setting state of the USM is an on state (e.g., "Yes" in the operation S520), the seat control apparatus may perform an operation S530.

For example, when the massage function compulsory driving setting state of the USM is an off state (e.g., "No" in the operation S520), the seat control apparatus may perform an operation S529.

According to an embodiment, the seat control apparatus may execute (or perform) the massage function (an operation S530).

For example, the seat control apparatus may immediately perform the massage function regardless of whether other conditions for determining whether to execute the massage function are satisfied.

According to an embodiment, in the operation S529, the seat control apparatus may determine whether to execute the massage function based on the state of the host vehicle and/or the location of seat.

Figure 6:
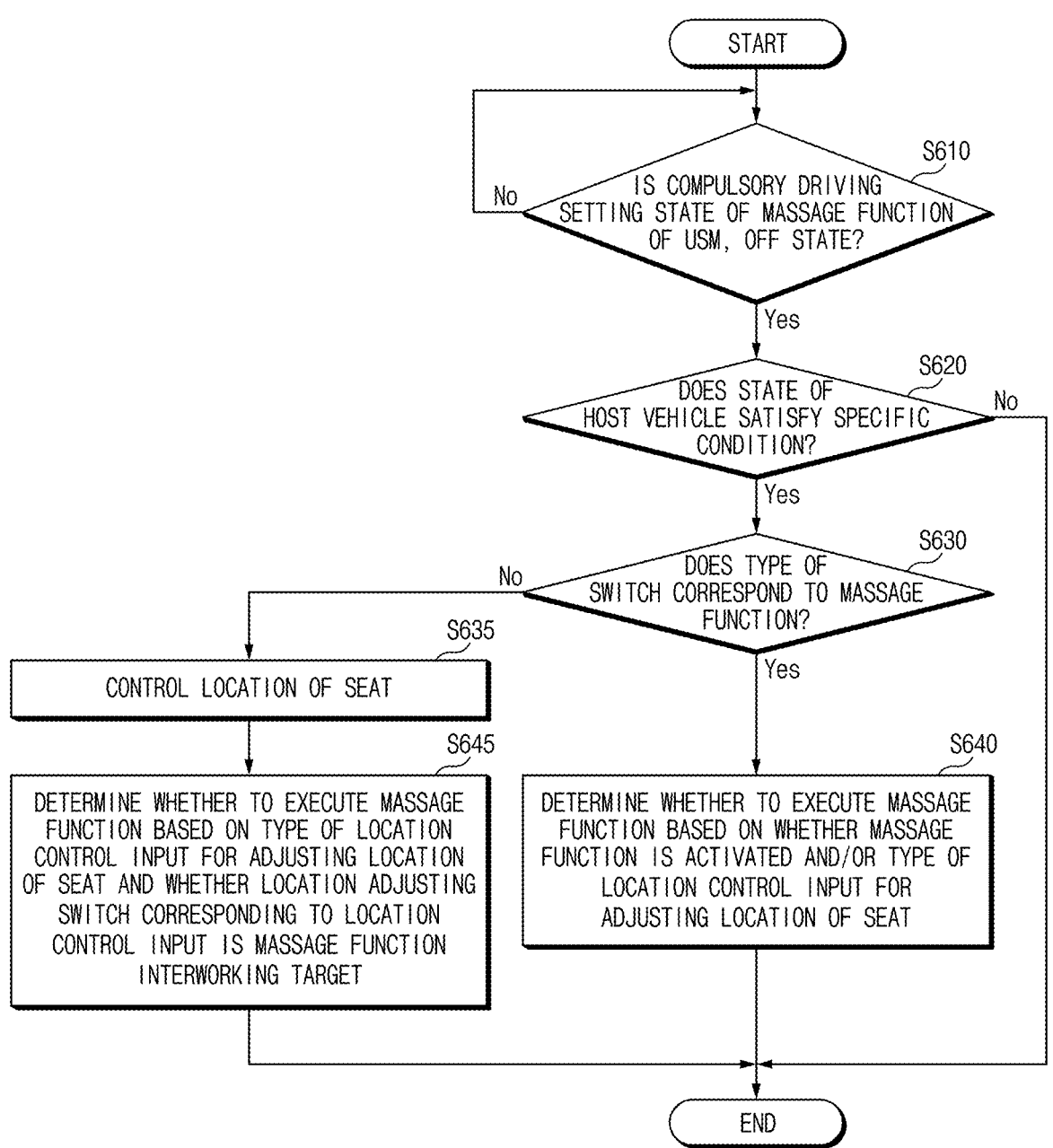
FIG. 6 is a flowchart of a seat control method according to an embodiment of the present disclosure.

FIG. 6 is a flowchart of a seat control method according to an embodiment of the present disclosure.

According to an embodiment, a seat control apparatus (e.g., the seat control apparatus 100 of FIG. 1) may perform the operations disclosed in FIG. 6. For example, the components (e.g., the input part 110, the first driving part 120, the second driving part 130, the memory 140, the controller 150, and the sensor part 160 of FIG. 1) included in the seat control apparatus may be configured to perform the operations of FIG. 6.

In the following embodiments, operations S610 to S645 may be performed sequentially, but are not necessarily performed sequentially. For example, a sequence of the operations may be changed, and at least two operations may be performed in parallel. Furthermore, contents that correspond to or overlap the contents described above with reference to FIG. 6 may be briefly described or omitted.

Furthermore, an operation S610, which is described below, may be performed after the seat control apparatus receives a user input from the user.

According to an embodiment, in the operation S610, the seat control apparatus may identify whether the compulsory driving setting state of the massage function of the USM is an off state.

For example, when the compulsory driving setting state of the massage function of the USM is an off state (e.g., "Yes" in the operation S610), the seat control apparatus may perform an operation S620.

For example, when the compulsory driving setting state of the massage function of the USM is not an off state (or an on state) (e.g., "No" in the operation S610), the seat control apparatus may repeatedly perform the operation S610. As another example, in this case, the seat control apparatus may immediately perform the massage function.

According to an embodiment, in the operation S620, the seat control apparatus may identify whether the host vehicle state satisfies a specific condition.

In an embodiment, the specific condition may include a condition regarding at least one of: i) an inter-vehicle distance between the host vehicle and another vehicle, ii) whether there is a collision between the host vehicle and an external object, iii) whether a user is seated on the seat, iv) whether a child seat is mounted on the seat, v) a power state of the host vehicle, vi) a battery state of the host vehicle, vii) a driving speed of the host vehicle, or any combination thereof.

For example, when it is identified that the state of the host vehicle satisfies a specific condition (e.g., "Yes" in the operation S620), the seat control apparatus may perform an operation S630.

For example, when it is identified that the state of the host vehicle state does not satisfy the specific condition (e.g., "No" in the operation S620), the seat control apparatus may end the operation.

According to an embodiment, in an operation S630, the seat control apparatus may identify whether the type of the switch corresponds to the massage function.

When it is identified that the type of the switch corresponds to the massage function (e.g., "Yes" in the operation S630), the seat control apparatus may perform an operation S640.

Meanwhile, when it is identified that the type of the switch does not correspond to the massage function (e.g., "No" in the operation S630), the seat control apparatus may perform an operation S635.

According to an embodiment, in the operation S635, the seat control apparatus may perform the seat location control function when the type of the switch does not correspond to the massage function (or when the type of the switch corresponds to the seat location control function).

According to an embodiment, in an operation S645, the seat control apparatus may determine whether to execute the massage function based on the type of the location control input for adjusting the location of the seat and the massage function interlocking target of the location adjusting switch corresponding to the location control input.

According to an embodiment, in an operation S640, the seat control apparatus may determine whether to execute the massage function based on whether the massage function is activated and/or the type of location control input for adjusting the seat location.

Figure 7:
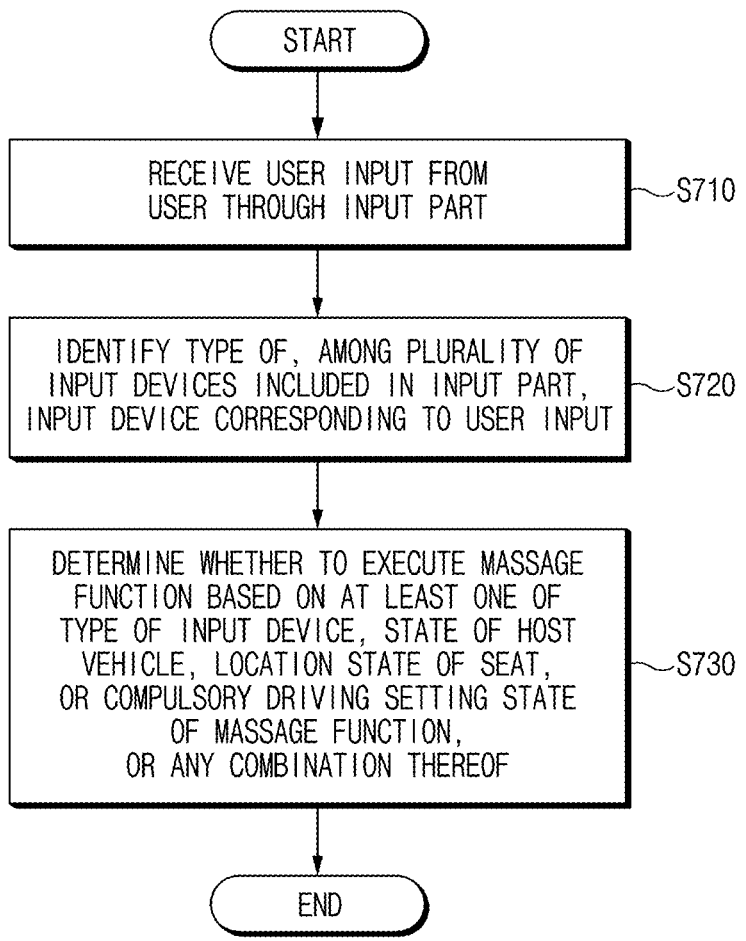
FIG. 7 is a flowchart of a seat control method according to an embodiment of the present disclosure.

FIG. 7 is a flowchart of a seat control method according to an embodiment of the present disclosure.

According to an embodiment, a seat control apparatus (e.g., the seat control apparatus 100 of FIG. 1) may perform the operations disclosed in FIG. 7. For example, the components included in the seat control apparatus (e.g., the input part 110, the first driving part 120, the second driving part 130, the memory 140, the controller 150, and the sensor part 160 of FIG. 1) may be configured to perform the operations (i.e., S710, S720 and S730) of FIG. 7.

In the following embodiments, operations S710 to S730 may be performed sequentially, but are not necessarily performed sequentially. For example, a sequence of the operations may be changed, and at least two operations may be performed in parallel.

Furthermore, contents that correspond to or overlap the contents described above in relation to FIG. 7 may be briefly described or omitted.

According to an embodiment, the seat control apparatus may receive a user input from the user through the input part (S710).

According to an embodiment, the seat control apparatus may identify, among a plurality of input devices included in the input part, a type of an input device corresponding to the user input in the operation S720.

For example, the type of the input device may include a first switch type corresponding to the location control function and a second switch type corresponding to the massage function.

For example, the first switch type may include a manual switch and an automatic switch.

According to an embodiment, in the operation S730, the seat control apparatus may determine whether to perform the massage function based on information on at least one of: i) the type of the input device, ii) the state of the host vehicle, iii) the location state of the seat, iv) the compulsory driving setting state of the massage function, or any combination thereof.

Figure 8:
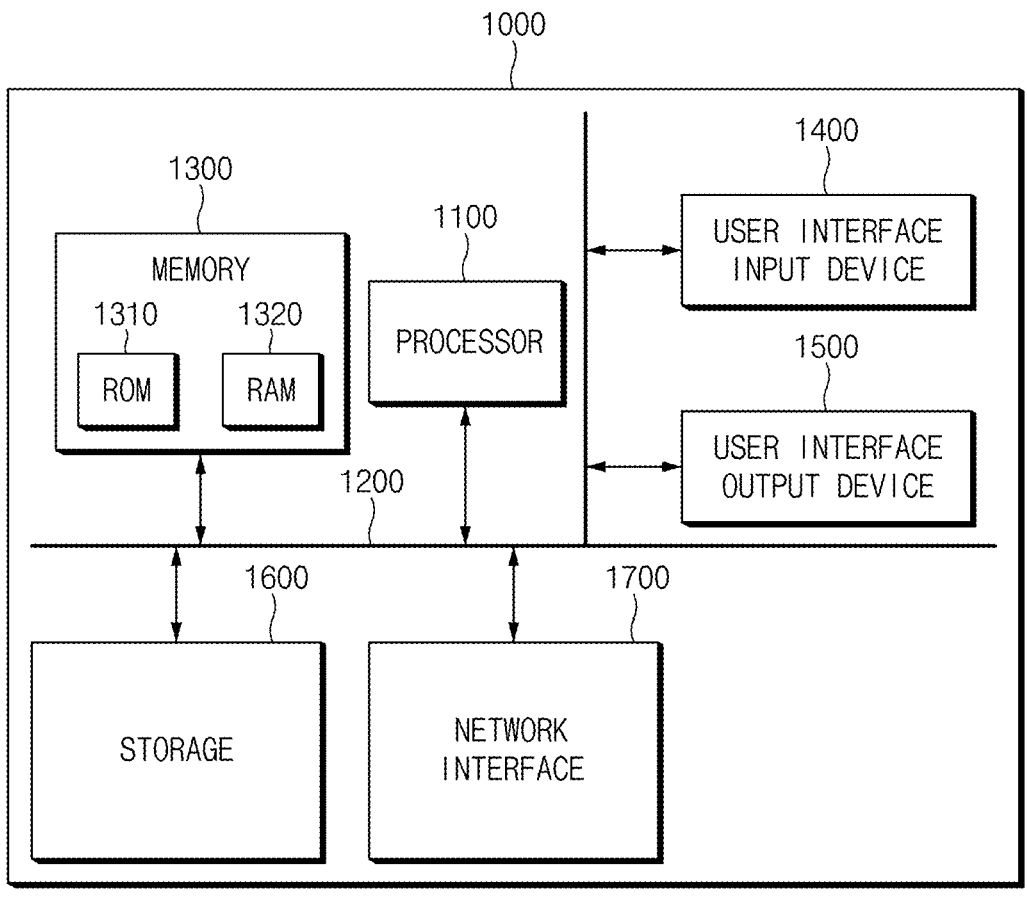
FIG. 8 illustrates a computing system for a seat control apparatus or a seat control method according to an embodiment of the present disclosure.

FIG. 8 illustrates a computing system for a seat control method according to an embodiment of the present disclosure.

Referring to FIG. 8, a computing system 1000 regarding the seat control method may include at least one processor 1100, a memory 1300, a user interface input device 1400, a user interface output device 1500, storage 1600, and a network interface 1700, which are connected through a bus 1200.

The processor 1100 may be a central processing unit (CPU), or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The effects of the seat control apparatus and the seat control method according to the present disclosure are described as follows.

According to at least one of the embodiments of the present disclosure, an inefficient situation, in which the massage function is operated in an unnecessary situation, may be prevented by determining whether to operate (or activate) the massage function based on information on at least one of the location state (or an operation state) of the seat, the state of the host vehicle, the type of the input device, or the compulsory driving setting state of the massage function, or any combination thereof.

Furthermore, according to at least one of the embodiments of the present disclosure, convenience of the user may be enhanced, the lifespans of the parts mounted on the seat may be prolonged, and electric power may be saved by determining whether to operate the massage function while sufficiently considering various environments.

In addition, according to at least one of the embodiments of the present disclosure, a situation, in which the massage function even becomes a threat to the safety of the user, may be prevented in advance by operating or not stopping the massage function in an unnecessary situation.

In addition, various effects directly or indirectly recognized through the specification may be provided.

The above description is a simple illustrative description of the technical spirit of the present disclosure, and the present disclosure may be variously modified and altered by an ordinary person in the art, to which the present disclosure pertains, without departing from the essential characteristics of the present disclosure.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A seat control apparatus comprising:

an input part;

a first driving part configured to adjust a location of a seat;

a second driving part configured to perform a massage function;

a memory configured to store one or more instructions; and a controller operatively connected to the input part, the first driving part, the second driving part, and the memory, wherein the instructions are configured to, when executed by the controller, cause the seat control apparatus to:

receive a user input from a user through the input part;

among a plurality of input devices included in the input part, identify a type of an input device corresponding to the user input; and determine whether the massage function is to be performed, based on information of at least one of the identified type of the input device, a state of a host vehicle, a location state of the seat, a compulsory driving setting state of the massage function, or any combination thereof, and wherein the instructions are configured to, when executed by the controller, further cause the seat control apparatus to:

perform a seat location control function corresponding to the input device when the identified type of the input device corresponds to the seat location control function; and determine whether the massage function is to be executed based on at least one of a type of a location control input for performing the seat location control function, whether an automatic activation of the massage function is possible while the seat location control function is performed, whether the input device corresponds to a massage function interlocking target, or any combination thereof.

2. The seat control apparatus of claim 1, wherein the instructions are configured to, when executed by the controller, further cause the seat control apparatus to:

stop an operation of the second driving part when the location control input includes an automatic switch input for controlling the seat to a user non-seating section; and control the seat to the user non-seating section by using the first driving part.

3. The seat control apparatus of claim 1, wherein the instructions are configured to, when executed by the controller, further cause the seat control apparatus to:

identify whether the input device corresponds to the massage function interlocking target or whether the automatic activation of the massage function is possible while the seat location control function is performed when the location control input does not include an automatic switch input for controlling the seat to a user non-seating section; and perform the massage function by using the second driving part while adjusting the location of the seat based on the location control input by using the first driving part when the input device corresponds to the massage function interlocking target and the automatic activation of the massage function is set to be possible while the seat location control function is performed.

4. The seat control apparatus of claim 1, wherein the instructions are configured to, when executed by the controller, further cause the seat control apparatus to:

identify whether the input device corresponds to the massage function interlocking target and whether the automatic activation of the massage function is possible while the seat location control function is performed when the location control input does not include an automatic switch input for controlling a user non-seating section;

adjust the location of the seat based on the location control input by using the first driving part when the input device does not correspond to the massage function interlocking target or the automatic activation of the massage function is impossible while the seat location control function is performed; and deactivate the massage function.

5. The seat control apparatus of claim 1, wherein the instructions are configured to, when executed by the controller, further cause the seat control apparatus to:

identify the type of the input device when it is identified that the input device corresponds to the massage function interlocking target;

when the input device includes a manual switch:

perform the massage function based on that it is identified that the seat is located in a user seating section when the compulsory driving setting state of the massage function is an on state;

perform the massage function based on that it is identified that the state of the host vehicle satisfies a specific condition and the seat is located in the user seating section when the compulsory driving setting state of the massage function is an off state;

when the input device includes an automatic switch:

perform the massage function when the compulsory driving setting state of the massage function is an on state; and perform the massage function based on that it is identified that the state of the host vehicle satisfies the specific condition when the compulsory driving setting state of the massage function is an off state.

6. A seat control apparatus comprising:

an input part;

a first driving part configured to adjust a location of a seat:

a second driving part configured to perform a massage function;

a memory configured to store one or more instructions; and a controller operatively connected to the input part, the first driving part, the second driving part, and the memory, wherein the instructions are configured to, when executed by the controller, cause the seat control apparatus to:

receive a user input from a user through the input part;

among a plurality of input devices included in the input part, identify a type of an input device corresponding to the user input; and determine whether the massage function is to be performed, based on information of at least one of the identified type of the input device, a state of a host vehicle, a location state of the seat, a compulsory driving setting state of the massage function, or any combination thereof, and wherein the instructions are configured to, when executed by the controller, further cause the seat control apparatus to:

perform the massage function at a first intensity when a battery of the host vehicle is being charged or a state of charge (SoC) thereof is equal to or greater than a first value;

perform the massage function at a second intensity when the SoC of the battery is less than the first value and is equal to or greater than a second value, wherein the second intensity is lower than the first intensity and the second value is less than the first value; and stop performance of the massage function when the SoC of the battery is less than a third value that is less than the second value.

7. The seat control apparatus of claim 1, wherein the instructions are configured to, when executed by the controller, further cause the seat control apparatus to:

identify whether the compulsory driving setting state of the massage function is an on state when the identified type of the input device corresponds to the massage function;

perform the massage function when the compulsory driving setting state is the on state; and perform the massage function based on that it is identified that the state of the host vehicle satisfies a specific condition or the seat is located in a user seating section when the compulsory driving setting state is an off state.

8. The seat control apparatus of claim 7, wherein the specific condition includes:

a condition regarding at least one of an inter-vehicle distance between the host vehicle and another vehicle, whether the host vehicle and an external object collide with each other, whether the user is seated on the seat, whether a child seat is mounted on the seat, a power state of the host vehicle, a battery state of the host vehicle, a driving speed of the host vehicle, or any combination thereof.

9. The seat control apparatus of claim 7, wherein the instructions are configured to, when executed by the controller, further cause the seat control apparatus to:

perform the massage function regardless of whether the state of the host vehicle satisfies the specific condition when it is identified that the compulsory driving setting state of the massage function is the on state, based on a user setting mode (USM); and automatically perform the massage function based on that the user input for controlling the location of the seat to a specific location is received when it is identified an automatic activation setting state of the massage function for the specific location is an on state, based on the user setting mode.

10. A seat control method comprising:

receiving, by a controller, a user input from a user through an input part;

identifying, among a plurality of input devices included in the input part, a type of an input device corresponding to the user input by the controller; and determining, by the controller, whether a massage function is to be performed, based on information of at least one of the identified type of the input device, a state of a host vehicle, a location state of a seat, a compulsory driving setting state of the massage function, or any combination thereof, wherein determining whether the massage function is to be performed includes:

performing, by the controller, a seat location control function corresponding to the input device when the identified type of the input device corresponds to the seat location control function; and determining, by the controller, whether the massage function is to be executed based on at least one of a type of a location control input for performing the seat location control function, whether an automatic activation of the massage function is possible while the seat location control function is performed, whether the input device corresponds to a massage function interlocking target, or any combination thereof.

11. The seat control method of claim 10, further comprising:

stopping, by the controller, an operation of a second driving part when the location control input includes an automatic switch input for controlling the seat to a user non-seating section; and controlling, by the controller, the seat to the user non-seating section by using a first driving part.

12. The seat control method of claim 10, further comprising:

identifying, by the controller, whether the input device corresponds to the massage function interlocking target or whether the automatic activation of the massage function is possible while the seat location control function is performed when the location control input does not include an automatic switch input for controlling the seat to a user non-seating section; and performing, by the controller, the massage function by using a second driving part while adjusting a location of the seat based on the location control input by using a first driving part when the input device corresponds to the massage function interlocking target and the automatic activation of the massage function is set to be possible while the seat location control function is performed.

13. The seat control method of claim 10, further comprising:

identifying, by the controller, whether the input device corresponds to the massage function interlocking target and whether the automatic activation of the massage function is possible while the seat location control function is performed when the location control input does not include an automatic switch input for controlling a user non-seating section;

adjusting, by the controller, a location of the seat based on the location control input by using a first driving part when the input device does not correspond to the massage function interlocking target or the automatic activation of the massage function is impossible while the seat location control function is performed; and deactivating, by the controller, the massage function.

14. The seat control method of claim 10, further comprising:

identifying, by the controller, the type of the input device when it is identified that the input device corresponds to the massage function interlocking target;

when the input device includes a manual switch:

performing, by the controller, the massage function based on that it is identified that the seat is located in a user seating section when the compulsory driving setting state of the massage function is an on state;

performing, by the controller, the massage function based on that it is identified that the state of the host vehicle satisfies a specific condition and the seat is located in the user seating section when the compulsory driving setting state of the massage function is an off state;

when the input device includes an automatic switch:

performing, by the controller, the massage function when the compulsory driving setting state of the massage function is an on state; and performing, by the controller, the massage function based on that it is identified that the state of the host vehicle satisfies the specific condition when the compulsory driving setting state of the massage function is an off state.

15. The seat control method of claim 10, further comprising:

performing, by the controller, the massage function at a first intensity when a battery of the host vehicle is being charged or a state of charge (SoC) thereof is equal to or greater than a first value;

perform, by the controller, the massage function at a second intensity that is lower than the first intensity when the SoC of the battery is less than the first value and is equal to or greater than a second value, wherein the second value is less than the first value; and stopping, by the controller, performance of the massage function when the SoC of the battery is less than a third value that is less than the second value.

16. The seat control method of claim 10, further comprising:

identifying, by the controller, whether the compulsory driving setting state of the massage function is an on state when the identified type of the input device corresponds to the massage function;

performing, by the controller, the massage function when the compulsory driving setting state is the on state; and performing, by the controller, the massage function based on that it is identified that the state of the host vehicle satisfies a specific condition or the seat is located in a user seating section when the compulsory driving setting state is an off state.

17. The seat control method of claim 16, wherein the specific condition includes:

a condition regarding at least one of an inter-vehicle distance between the host vehicle and another vehicle, whether the host vehicle and an external object collide with each other, whether the user is seated on the seat, whether a child seat is mounted on the seat, a power state of the host vehicle, a battery state of the host vehicle, a driving speed of the host vehicle, or any combination thereof.

18. The seat control method of claim 16, further comprising:

performing, by the controller, the massage function regardless of whether the state of the host vehicle satisfies the specific condition when it is identified that the compulsory driving setting state of the massage function is the on state, based on a user setting mode (USM); and automatically performing, by the controller, the massage function based on that the user input for controlling the location of the seat to a specific location is received when it is identified an automatic activation setting state of the massage function for the specific location is an on state, based on the user setting mode.

* * * * *